April 18, 1933.  G. A. KING  1,904,055

DETACHABLE FASTENER

Filed April 18, 1932

INVENTOR
George A. King,
BY
Fraser, Myers & Manley,
his ATTORNEYS.

Patented Apr. 18, 1933

1,904,055

UNITED STATES PATENT OFFICE

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT

DETACHABLE FASTENER

Application filed April 18, 1932. Serial No. 605,851.

This invention relates to improvements in detachable fasteners, and is particularly applicable to fasteners of the type used in adjustably securing together a pair of strap ends. One use which has commonly been made of fasteners of this character is to secure together a pair of short straps relied upon to tighten a glove about the wrist.

It is an object of the invention to provide a fastener of the above-described character which may be adjusted to any position along the strap, held securely in any such adjusted position, and readily attached to and detached from a complementary fastener, the entire device being cut and bent to its final form from a single piece of sheet metal.

In the accompanying drawing illustrating preferred forms of the invention:—

The form of the invention illustrated by Figs. 1 to 5, inclusive, will first be described.

Figure 1:
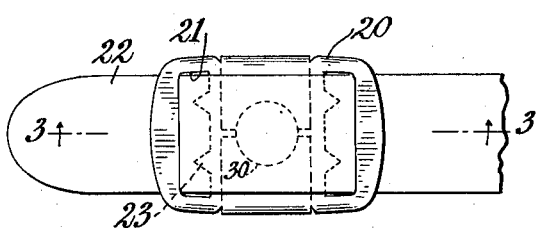
Figure 1 is a face view of a fastener element embodying the invention in the form of a resilient snap fastener socket in its assembled relation with a strap.
Figure 3:
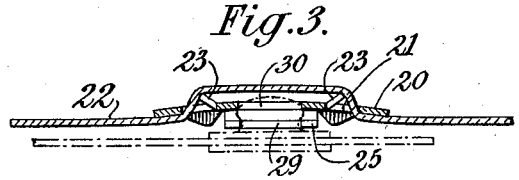
Fig. 3 is a longitudinal section through the fastener socket illustrated in Fig. 1, the section being taken along the line 3—3, a complementary stud element being indicated in broken lines.
Figure 5:
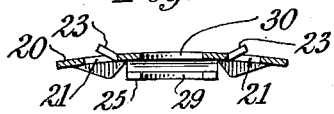
Fig. 5 is a longitudinal sectional view through the fastener, the section being taken along the line 5—5 of Fig. 2, and the socket being represented as detached from the strap.

The fastener element 20, preferably of rectilinear form, may be provided with a pair of slots 21 across its opposite ends, through which may be threaded the end of a strap 22, as best illustrated in Figs. 1 and 3, and suitable means may be provided whereby the device may be securely held in any desired position of adjustment along the strap, as by striking up a series of spurs 23 along one or more of the margins of the slotted portions.

Figure 2:
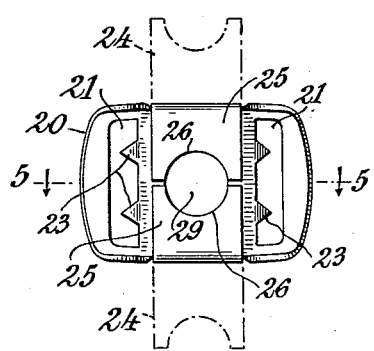
Fig. 2 is a reverse view of the same fastener element, the portions represented in broken lines being parts of the blank from which the device is made before being bent to final form.
Figure 4:
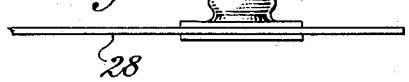
Fig. 4 is a side view of the stud element of the fastener detached from the socket.

The detachable attaching element of the fastening device, which in the form of the invention illustrated in Figs. 1 to 5 is a resilient socket element, may be formed by bending inwardly a pair of oppositely-disposed portions 24, provided for such purpose as a part of the blank from which the device is made, to the positions indicated at 25 in Fig. 2. These portions 24 should be of such length that when bent to their final forms the ends will be mutually adjacent each other, and these adjacent ends may be provided with a pair of semi-circular recesses 26 which jointly form a circular socket adapted to receive a complementary stud 27 (Fig. 4).

The stud 27 may be secured to a strap 28 in any appropriate manner, and the two straps 22, 28 may be readily connected and disconnected by snapping the stud 27 into and removing it from the socket 29 formed by the semi-circular recesses 26 in the ends of the inturned portions of the device 25.

When inserting the stud 27 in the socket 29 and when withdrawing it therefrom, the portions 25 of the device are forced slightly in opposite directions, but, since these inturned portions are a mere continuation of the face portion of the fastener, the bending of the material when inserting and withdrawing the stud is distributed over such a large area of the metal that the local strain at any particular part of the device is negligible. The resulting structure, therefore, is a very simple and correspondingly cheap, but at the same time equally durable and satisfactory, snap fastener element made entirely from a single piece of stamped sheet metal.

If desired, the face portion of the fastener may be perforated as indicated at 30 (Fig. 5), and the opening thus produced may be relied upon to provide clear space for the upper portion of the stud as indicated in Fig. 3. When made in this form the parts of the fastener may, if desired, be separated by a pressure of the thumb or finger against the surface of the strap overlying the stud, whereby it may be forced out of its engagement with the socket.

Figure 6:
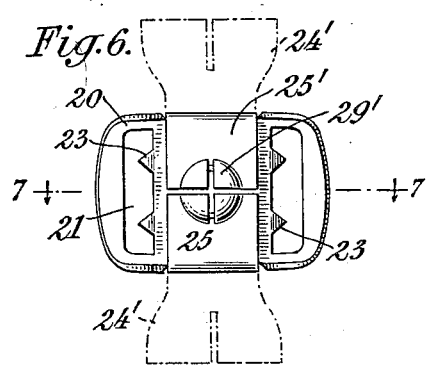
Fig. 6 is a rear face view of a fastener element embodying the invention in modified form, the attaching element being a resilient stud rather than a socket.
Figure 7:
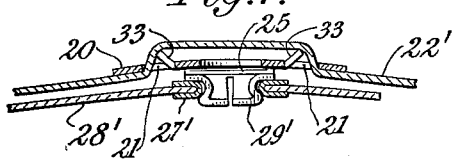
Fig. 7 is a longitudinal sectional view of the fastener element illustrated in Fig. 6, the section being taken along the line 7—7, and the device being represented in its assembled relations with a socket element and a pair of straps.

The form of the invention illustrated in Figs. 6 and 7 differs from that heretofore described in that the parts of the blank 24' are of shapes such that they may be pressed to forms adapted to cooperate with each other when the parts are bent inwardly to the positions indicated at 25' and produce a resilient stud element 29'. The snap fastener stud thus formed may be assembled with a strap 22', and the stud may be detachably secured to a simple, rigid socket element 27' secured in any appropriate manner in a strap 28'.

Except for the substitution of the resilient stud element for the resilient socket element, the fastener element illustrated in Figs. 6 and 7 may conform with the one illustrated in Figs. 1 to 5, inclusive.

The invention is not intended to be limited to the specific forms selected for purposes of illustration but should be regarded as covering modifications and variations thereof within the scope of the appended claims.

What is claimed is:

1. A detachable snap fastener comprising a stud element having a socket-engaging head and an underlying neck of a diameter less than that of the head and a socket element having a throat of a diameter less than that of the head of the stud but great enough to receive its neck, one of said fastener elements comprising a single piece of metal having strap-receiving slots disposed along a pair of opposite margins and portions turned and extended inwardly from the intervening margins and provided with closely adjacent terminal portions of forms and dimensions such as to serve as the means of attachment with the attaching portion of the other fastener element and have direct but resilient engagement therewith.

2. A snap fastener, as defined by claim 1, of which the adjacent ends of the inturned portions of one of the fastener elements are recessed to form the throat of a stud-receiving socket and of which the other fastener element serves as the stud.

3. A detachable snap fastener comprising a stud element having a socket-engaging head and an underlying neck of a diameter less than that of the head and a one-piece socket element comprising a single piece of metal having a perforation therein of a diameter such as to freely receive but very closely surround the head of the stud element when the two elements of the fastener are assembled, the socket element also having oppositely-disposed portions turned and extended inwardly from its margins and provided with closely adjacent recessed ends so formed and dimensioned as to provide for the stud-receiving socket a resilient throat of a diameter less than that of the head of the stud but great enough to receive the neck of the stud.

4. A snap fastener, as defined by claim 3, of which the socket element has oppositely-disposed slotted portions by means of which it may be adjusted to any desired position on a strap.

In witness whereof, I have hereunto signed my name.

GEORGE A. KING.